Nov. 6, 1934.                 W. F. MacGREGOR                    1,979,974
                               HARVESTER PICK-UP
                              Filed July 17, 1933

INVENTOR.
WALLACE F. MACGREGOR
BY James A. Walsh,
                ATTORNEY

Patented Nov. 6, 1934

1,979,974

UNITED STATES PATENT OFFICE 1,979,974

HARVESTER PICK-UP

Wallace F. MacGregor, Racine, Wis., assignor to J. I. Case Company, Racine, Wis., a corporation Application July 17, 1933, Serial No. 680,683

7 Claims. (Cl. 56—364)

My invention relates to improvements in baling machinery of the character disclosed in Letters Patent No. 1,919,897, issued July 25, 1933, by which I am enabled as conditions require to either draw the machinery through a field and pick up windrowed hay from the ground and convey it to the baler, or position the machinery adjacent a stack or pile and load the material onto a pick-up to be conveyed to a baler, the actuating means for the pick-up during the first operation being ground driven, and for operation in a stationary position the ground drive is dispensed with and the pick-up actuated by power from the baler or other source as will hereinafter more fully appear.

Figure 1:
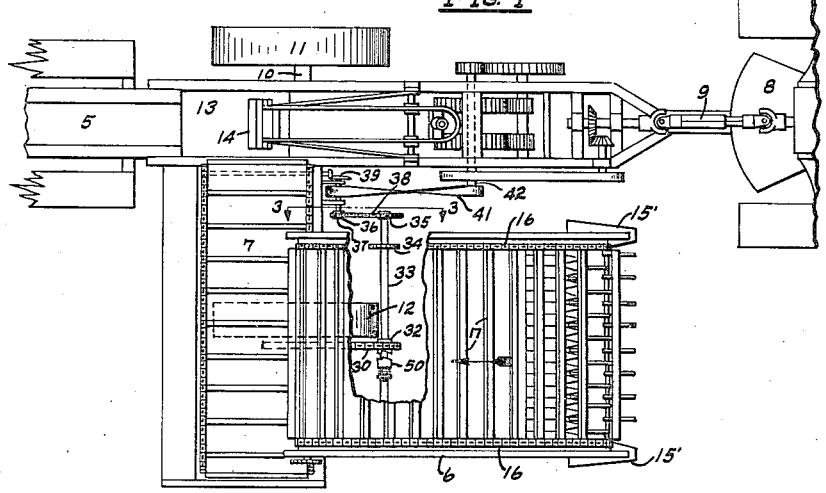
Figure 2:
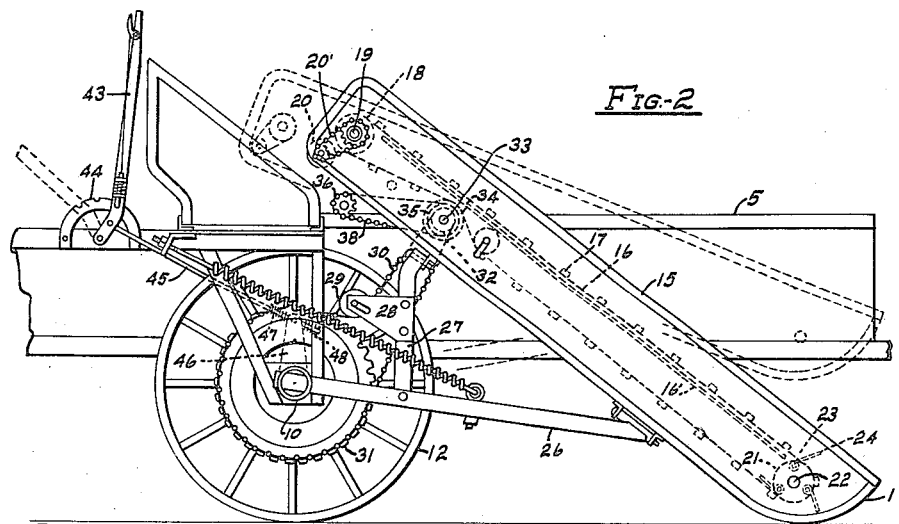
Figure 3:
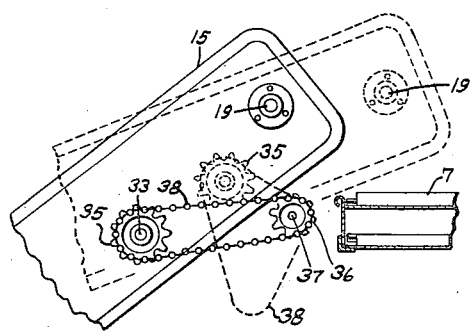

In the accompanying drawing, forming a part hereof, Figure 1 is a plan view of a combination baler and pick-up embodying my invention; Fig. 2, a side elevation thereof; and Fig. 3 a fragmentary side elevation taken on the dotted line 3—3 in Fig. 1.

In said drawing it will be understood from Fig. 1 that the combination baler 5, pick-up 6, and cross conveyor 7, may be drawn through a field and the mechanism thereof actuated by a tractor 8 having a power take-off shaft 9 connected to the baler, but it will be understood that any suitable driving power may be employed.

The baler 5 is in part secured to and supported by a rocking axle 10 carried by the wheels 11, 12, the latter wheel 12 being extended in relation to the baler for supporting the pick-up, the baler, as is common, comprising a suitable body embodying a baling chamber 13 in which material is inserted by the feeder head 14 of any desired construction, and compressed by a plunger (not shown).

The pick-up comprises a body 15 having shoes 15' in which body is mounted a carrier formed of chains 16 connected by cross slats 17, and which chains travel about a floor 16', thence over upper sprockets 18 mounted on shaft 19, and also over lower sprockets 21 mounted on shaft 22, said sprockets 21 carrying shafts 23 upon which tines or fingers 24 are supported to revolve with these sprockets. At the upper end of the carrier a roller 20 is mounted and driven by a chain, as 20', and other details of construction are embodied in the carrier but being no part of my present invention need not be specifically described herein.

The pick-up is pivotally mounted on axle 10 by means of a push-bar 26 and standard 27, the latter carrying a bracket 28 supporting a tightener 29 for controlling a chain 30 connecting a sprocket 31 on the wheel 12 to the sprocket 32 in the pick-up loosely mounted on a shaft 33 having a sprocket 34 at each end engaging the respective chains 16 for driving the carrier in the direction indicated by the arrow in Fig. 1. Said shaft 33 at its inner end is provided with a sprocket 35 connected to sprocket 36 on a drive shaft 37 by a chain 38, which latter shaft is also geared at 39 to the cross conveyor 7, said shaft 37 in turn being connected at 41 to a drive shaft 42 actuated by any suitable power such as a tractor or otherwise whereby the carrier and cross conveyor may be operated.

Vertical adjustment of the pick-up may be accomplished by a lever and quadrant 43, 44, located at any convenient place on the baler, to which a rod 45 is secured and at its opposite end is slidably attached to an arm 46, springs 47, 48, being retained on said rod at opposite sides of the arm 46 so that when said rod is adjusted longitudinally it will be held in locked position by the lever and quadrant to hold the pick-up at the desired elevation.

As indicated, the machine in general includes the details of construction and arrangement disclosed in said patent, and further description may be limited to the specific improvements hereinbefore referred to. When the machinery is to be operated for gathering and baling material from windrows and the like, the carrier is adjusted to the position indicated by dotted line in Figs. 2 and 3, which adjustment moves the shaft 33 into closer proximity with shaft 37 so that chain 38 may be removed from sprockets 35, 36, and upon returning the carrier to full line position and engaging slip-clutch members 50 the sprocket-and-chain system 30, 31, 32, through the ground wheel 12, will actuate the pick-up carrier and associated mechanisms to gather material while the machinery is moving through the field and deliver the same to the cross conveyor 7 to be conveyed thereby to the baler 5, the cross conveyor, as will be understood, being actuated from shaft 37. When it is desired to operate the baling machinery in stationary position adjacent a stack or pile of material the carrier is adjusted to the position shown in dotted line, Figs. 2 and 3, and the chain replaced, which movement throws the sprockets 35, 36, into the position shown in full lines in Fig. 3, thus drawing said chain taut thereabout, and upon disengaging clutch 50 to render the ground drive inoperative the carrier and cross conveyor will be actuated by the shafts 33, 37, so that the material may be loaded onto the carrier to be conveyed by it and the cross conveyor to the baling machine to be baled. In the simple manner shown and described it will be seen that the machinery may be readily converted into a traveling ground driven outfit for gathering material in its path to be baled, and as readily adjusted for operation stationarily when it is desired to bale from stacks and the like. And it will also be understood that when in working position as indicated in full lines, Fig. 2, the runners 15' of the pick-up will so stabilize said structure and parts associated therewith as to prevent straining or disruption of the gear systems forming part of the machinery.

I claim as my invention:

1. In a machine of the class described, the combination, with a wheeled support, of means for gathering and elevating cut material from the ground, ground driven means associated with and actuating the gathering means while the latter is traveling, means for rendering said driven means inoperative, means for conveying material from the gathering means, means for receiving material from the conveying means, and means associated with the conveying, receiving and gathering means for actuating the gathering means when the latter is in stationary position.

2. In a machine of the class described, the combination, with a wheeled support, of means for gathering cut material, means for actuating the gathering means while traveling to pick material from the ground, means for receiving material from the gathering means, and means independently of said actuating means associated with the receiving means and the gathering means for operating the latter when in stationary position.

3. In a machine of the class described, the combination, with a wheeled support, of means for gathering cut material from the ground including a shaft, means connecting the support and shaft for actuating the gathering means while the machine is traveling, means for receiving material from the gathering means, means associated with the receiving means and the gathering means for driving said shaft, and detachable means connecting the driving means and said shaft for actuating the gathering means when the machinery is in stationary position.

4. In a machine of the class described, the combination, with a wheeled support, of means for gathering cut material from the ground, means for pivotally and drivingly supporting the gathering means, a shaft associated with the gathering means for operating the latter, means for receiving material from the gathering means including a shaft, a sprocket-and-chain system connecting said shafts for actuating the gathering means, and means for tilting the gathering means whereby its shaft will be adjusted in closer relation with the shaft on the receiving means to release the chain of said system so that the gathering means will be actuated independently of the shaft on the receiving means to gather material while the machine is traveling.

5. In a machine of the class described, the combination, with a wheeled support, of means for gathering material from the ground, means for pivotally connecting the gathering means and support, a shaft associated with the gathering means, ground driven means connecting the supporting means and shaft for operating the gathering means while traveling, means for receiving material from the gathering means, a shaft associated with the receiving means, a sprocket-and-chain system connecting said shafts, means for disengaging the gathering means from the ground driven means when the machine is in stationary position, and means for tilting the gathering means whereby its shaft will be adjusted away from the shaft on the receiving means to tighten the chain of said system so that the gathering means will be actuated to receive and convey material to the receiving means when the machinery is in stationary position.

6. In a machine of the class described, the combination, with a support, of means including a carrier for removing material from the ground, a ground wheel on the support having a sprocket associated therewith, a shaft associated with the carrier and having a sprocket in alignment with the wheel sprocket, a chain connecting said sprockets so that the wheel will actuate the carrier when the gathering means is traveling, means for controlling rotation of the shaft to effect the actuation thereof as the gathering means is traveling, means for receiving material from the gathering means, a shaft associated with the receiving means, and means connecting the shaft of the receiving means and the shaft of the gathering means whereby the carrier will be actuated when the machine is in stationary position and the carrier shaft declutched.

7. In a machine of the class described, the combination, with a support, of gathering means including a carrier, means for receiving and delivering material from the carrier, a wheel on the support for sustaining the gathering means, a shaft associated with the carrier, means connecting the wheel and shaft for actuating the carrier while traveling, means for disengaging the carrier shaft from said actuating means when the gathering means is operated in stationary position, means for receiving material from said delivery means, a shaft associated with the receiving means, means for operatively connecting the latter shaft with the delivery means, and means connecting the delivering means with the carrier shaft whereby the carrier will be actuated independently of the wheel when the machine is in stationary position.

WALLACE F. MacGREGOR.